Figure 1:
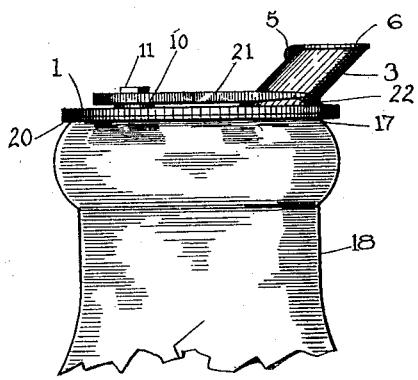

J. B. PETERS.
BOTTLE CLOSURE.
APPLICATION FILED NOV. 4, 1913.

1,115,733.

Patented Nov. 3, 1914.

Witnesses
Arthur F. Draper
Anna M. Dorr

Inventor
John B. Peters
By
Attorneys

UNITED STATES PATENT OFFICE.

JOHN B. PETERS, OF DETROIT, MICHIGAN.

BOTTLE-CLOSURE.

1,115,733.  Specification of Letters Patent.  Patented Nov. 3, 1914.

Application filed November 4, 1913. Serial No. 799,112.

*To all whom it may concern:*

Be it known that I, JOHN B. PETERS, a citizen of the United States of America, residing at Detroit, in the county of Wayne and State of Michigan, have invented certain new and useful Improvements in Bottle-Closures, of which the following is a specification, reference being had therein to the accompanying drawings.

This invention relates to closures for milk bottles, and the primary object of my invention is to provide a milk bottle lid or closure, with positive and reliable means, in a manner as hereinafter set forth, whereby the lid or closure can be detachably mounted upon a milk bottle to permit of the same being used similar to a milk or cream pitcher.

Another object of my invention is to provide a lid or closure for milk bottles that has a spout provided with a gravity seated lid or valvular member that protects the pouring edges of the spout and prevents foreign matter from entering the same.

A further object of this invention is to accomplish the above result by a simple, durable and inexpensive milk bottle attachment that can be easily and quickly placed in position to close the milk bottle when the same is not in use, thereby preventing the contents of the milk bottle or the pouring edges thereof from being contaminated or soiled by insects and foreign matter.

My invention will be hereinafter specifically described and then claimed, and reference will now be had to the drawing, wherein there is illustrated a preferred embodiment of my invention, but it is to be understood that the structural elements are susceptible to such variations and modifications as fall within the scope of the appended claims.

Figure 2:
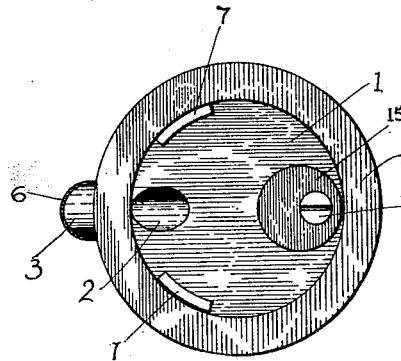
Figure 3:
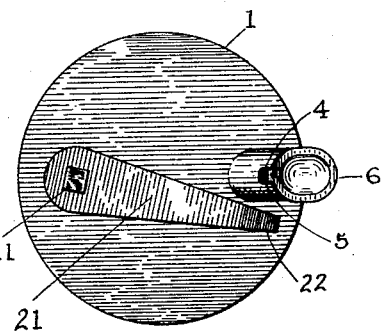
Figure 4:
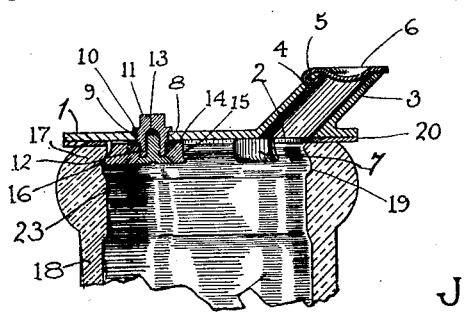

In the drawing, Figure 1 is a side elevation of the milk bottle closure, showing a spanner wrench in position to lock or unlock the closure relatively to the milk bottle; Fig. 2 is a bottom plan of the closure; Fig. 3 is a top plan of the same; Fig. 4 is a cross sectional view of the closure as applied to a milk bottle; and Fig. 5 is side elevation of a locking member.

A closure in accordance with this invention comprises a flat circular plate or disk 1, provided with an opening 2 that is in communication with an angularly disposed spout 3, which is preferably formed integral with the plate or disk and has its pouring edge extending beyond the edge of the plate 1 and in a plane parallel with the plane of said plate. The inner or rear wall of the spout 3 has an opening 4 to receive a curved or hook-shaped tongue 5 carried by the rear edge of a dished or convexo-concave lid 6 seated by gravity upon the pouring edges of the spout 3 to protect the same from insects and to prevent foreign matter from entering the spout 3.

The inner side of the plate or disk 1 is provided with depending curved rim members 7 disposed in the arc of a circle having for its center the center of the plate or disk 1, said rim members being approximately 120 degrees apart with the opening 2 between said rim members and intersecting the arc upon which said members are located.

The plate or disk 1 has an adjustable clamping member which is also disposed in the arc of the circle of said rim members. The clamping member comprises a spindle 8 rotatably mounted in an opening 9 provided therefor in the plate or disk 1. One end of the spindle 8 terminates in a peripheral flange 10 and in a rectangular shank 11. The opposite end of the spindle 8 terminates in a rectangular shank 12 and said shank and said spindle have a longitudinal bore or socket 13 with the walls thereof screw-threaded. Arranged upon the inner end of the spindle 8 is a gasket or washer 14 and mounted upon the shank 12 against said gasket or washer is a cam or eccentric gripping member 15. This member is best shown in Fig. 5 where it will be observed that the periphery thereof is provided with a beveled flange 16 and this flange is adapted to coöperate with the rim members 7 and the cam surface of the member 15 in locking the plate or disk 1 upon the rim 17 of a milk bottle neck 18 or the neck or opening of other receptacles. The inner wall of the rim 17 has an annular groove or seat 19 for the ordinary cap or disk (not shown) generally employed for closing the mouth or neck of a milk or cream bottle. It is the walls of this groove or seat that the rim members 7 and the clamping member engage for retaining the plate 1 upon the rim 17, and to insure a non-leakable connection between said plate and said rim, I interpose a gasket or washer 20, as shown in Fig. 4.

To facilitate rotating the clamping member 1 preferably use a flat spanner wrench 21, shown in Figs. 1 and 3. The wrench fits upon the shank 11 of the spindle 8 and permits of sufficient leverage being used to rotate the clamping member and lock said member and the rim members 7 in engagement with the walls of the rim 17. The wrench 21 has a beveled end 22 which can be used for removing the ordinary cap from the mouth of the milk bottle, also for prying off the plate or disk 1 should the same adhere to the rim 17.

It is through the medium of a cam or eccentric member 15 that the rim members 7 are forced into engagement with the walls or groove of the seat 19 and simultaneous with this movement the flange 16 tends to firmly seat the plate or disk upon the rim 17. The cam or eccentric member 15 is retained upon the shank 12 by a counter-sunk screw 23 mounted in the bore 11 of said shank, and said cam or eccentric member 15 coöperates with the peripheral flange 10 in preventing the spindle 8 from becoming accidentally displaced.

What I claim is:—

1. In a milk bottle closure, the combination with a bottle rim, of a flat plate seated thereon, spaced depending rim members carried by said plate and adapted to engage the inner side of said rim, a spindle journaled in said plate at a point equidistant from said members, a cam member on the inner end of said spindle, a screw mounted in said spindle for retaining said cam thereon, and a beveled flange carried by said cam member and adapted to engage said rim and coöperate with said rim members in engaging said rim to retain said plate seated thereon.

2. In a milk bottle closure, the combination with a bottle rim, of a flat plate seated thereon, spaced depending segment-shaped rim members carried by said plate, a spindle journaled in said plate at a point equi-distant from said members, a cam on the inner end of said spindle, a screw mounted in said spindle to retain said cam thereon, a beveled flange carried by a side wall of said cam and adapted to coöperate with said rim members in engaging said rim to retain said plate seated thereon, and a shank forming the outer end of said spindle and adapted to facilitate rotating the same.

In testimony whereof I affix my signature in presence of two witnesses.

JOHN B. PETERS.

Witnesses:
ANNA M. DORR,
C. R. STRIKNEY.

---

Copies of this patent may be obtained for five cents each, by addressing the "Commissioner of Patents, Washington, D. C."